United States Patent
Pulliam et al.

[15] 3,701,138
[45] Oct. 24, 1972

[54] FLUID LEVEL SENSOR AND SYSTEM
[72] Inventors: Joseph H. Pulliam; Thomas W. McCurnin, both of Tucson, Ariz.
[73] Assignee: Data Engineering, Inc., Tucson, Ariz.
[22] Filed: March 25, 1971
[21] Appl. No.: 128,038

[52] U.S. Cl. .................340/244 R, 338/25, 340/285
[51] Int. Cl. .............................................G08b 23/00
[58] Field of Search.........340/244 R; 338/27, 22, 55, 338/25

[56] References Cited

UNITED STATES PATENTS 2,824,278  2/1958  Johnston.................340/244 R
3,461,446  8/1969  Sergeant.................340/244 R

*Primary Examiner*—Thomas B. Habecker
*Attorney*—Harris, Kern, Wallen & Tinsley

[57] ABSTRACT

A sensor and system for sensing the level of fluid in a vessel above and below a predetermined level. The sensor comprises a base for mounting on a wall of the vessel with control and reference resistors on a support member extending from the base into the vessel. The resistors form legs of a normally balanced bridge circuit having an indicator connected to its output. A hollow housing having fluid inlet, outlet, and meniscus breaking means surrounds the resistors and support member to insure that the resistors are covered by fluid when fluid in the vessel is at or above the predetermined level and to rapidly drain and expose the control resistor when the fluid drops below the predetermined level to unbalance the bridge circuit and produce an indication at the indicator.

10 Claims, 5 Drawing Figures

PATENTED OCT 24 1972 3,701,138
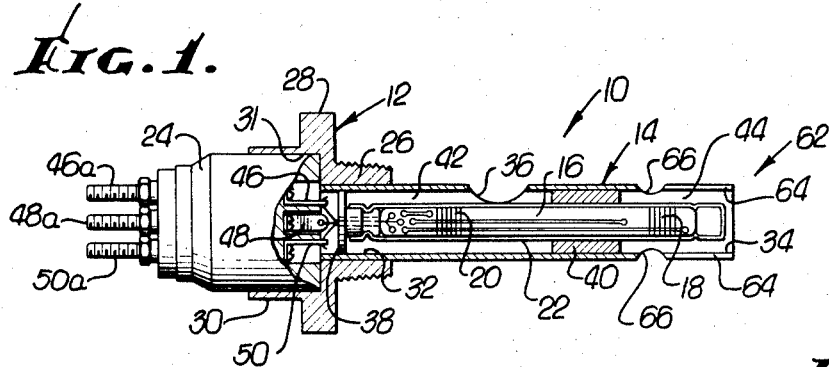
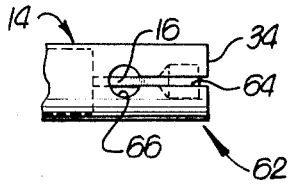
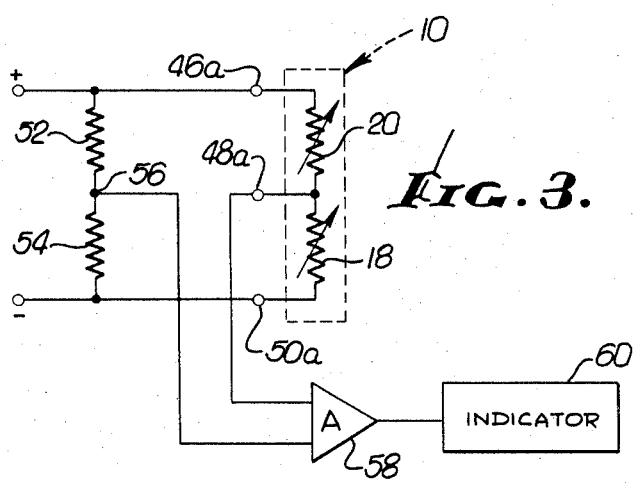
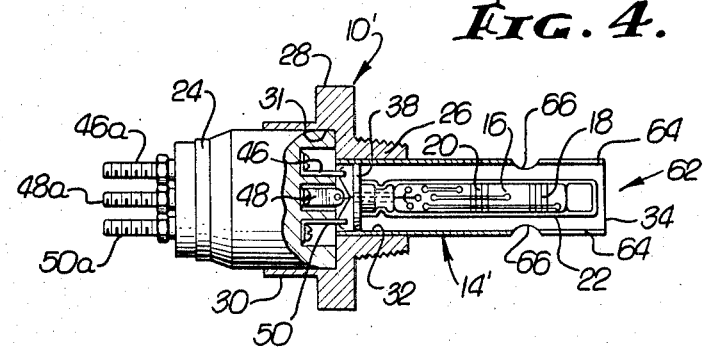
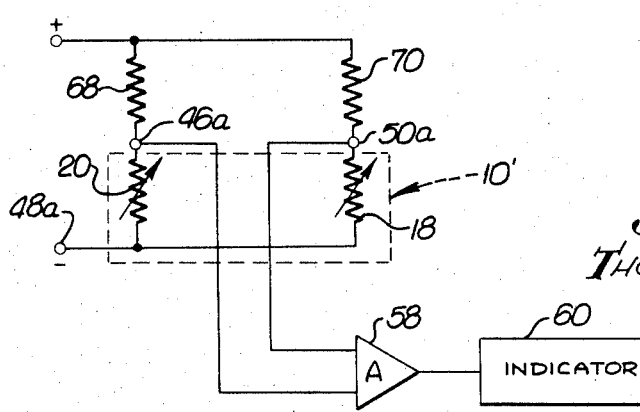
INVENTORS.
JOSEPH H. PULLIAM
THOMAS W. McCURNIN
BY THEIR ATTORNEYS
HARRIS, KIECH, RUSSELL & KERN

FLUID LEVEL SENSOR AND SYSTEM

The present invention relates to apparatus for detecting the level of fluids in a container or vessel and more particularly to a sensor and system for rapidly and accurately detecting changes in fluid level independent of variations in fluid temperature.

In various apparatus and machinery, it is important to sense and monitor the level of fluids in containers and reservoir vessels. This is particularly true in the heavy equipment field where it is necessary to insure that cooling and lubricating liquids such as water, oil, and brake and transmission fluids are at or above minimum safe levels in engines, transmissions, and the like. Different forms of fluid-level sensors and systems have been proposed to monitor the levels of such fluids. Unfortunately, the forms of sensors and systems heretofore proposed, particularly those including a single temperature sensitive element have proven unsatisfactory. This has been due, at least in part, to the wide range of temperatures to which such fluids are subjected and the inability of the sensors to respond reliably over such temperature ranges. In that regard, it is not at all unusual for heavy equipment engine oil to be subjected to temperature variations of over 260° F.

Accordingly, it is an object of the present invention to provide an improved sensor and system for rapidly and accurately detecting fluid level changes.

Another object of the present invention is to provide a sensor and system of the foregoing character which are accurate over a wide range of fluid temperatures and which are substantially unaffected by fluid temperature variations.

A further object of the invention is to provide a sensor of the foregoing character which is easily attached to the wall of a vessel about a predetermined fluid level and which includes reference and control resistors connected in a normally balanced bridge circuit to unbalance the bridge and provide an indication when fluid in the vessel drops below the predetermined level.

Still another object of the invention is to provide a sensor of the foregoing character including a housing for surrounding the resistors with fluid when at or above the predetermined level and for rapidly draining fluid from the control resistor when fluid drops below the predetermined level.

Other objects and advantages of the present invention may be more clearly understood by reference to the following detailed description when considered with the drawing, which, by way of example only, illustrates two embodiments including the features of the present invention.

In the drawing:

FIG. 1 is a side view partially in section of one form of sensor including the features of the present invention;

FIG. 2 is a fragmentary top view of an end portion of the sensor illustrated in FIG. 1;

FIG. 3 is a circuit diagram of a system including the sensor of FIG. 1;

FIG. 4 is a side view partially in section of another form of sensor including the features of the present invention; and FIG. 5 is a circuit diagram of a system in including the sensor illustrated in FIG. 4.

Generally speaking, the present invention comprises a sensor 10 having a base 12 for mounting on the wall of a vessel at a predetermined level. A hollow housing 14 extends from the base 12 and surrounds a support member 16 carrying a control resistor 18 and a reference resistor 20. The resistors and support member are shielded from direct contact with liquid in the vessel by a layer 22 of heat transmissive electrically and chemically inert material. An electrical connector 24 is included in the sensor to electrically connect the resistors 18 and 20 in a bridge circuit such as illustrated in FIG. 3 or FIG. 5.

In use, the housing 14 is designed such that when the liquid in the vessel is at or above a predetermined level, both the control and reference resistors are covered with liquid and the bridge circuit is balanced. When the liquid drops below the predetermined level, at least the portion of the housing 14 including the control resistor 18 rapidly drains to expose the control resistor to air or gas within the vessel. The gas or air is at the same approximate temperature as the liquid in the vessel. However, the ability of the gas to absorb heat from the control resistor is much less than the liquid. The control resistor temperature therefore rises and its resistance changes. This produces an immediate unbalance of the bridge circuit and indication at the associated indicator that fluid in the vessel has dropped below the predetermined level.

It bears noting that the control and reference resistors 18 and 20 are normally covered with liquid and are subjected to like temperatures. This condition is maintained despite changes in the temperature of the liquid. Accordingly, while the liquid temperature may vary over a wide range, the control and reference resistors are exposed to a common temperature and any variation in the resistances thereof with changes in temperature are balanced.

Further, while the function of the sensor and system just described has been to provide an indication when the liquid drops below a predetermined level, by reversal of the indicator circuitry, an indication may be provided when the liquid rises to the predetermined level to completely cover the control and reference resistors and balance the bridge circuit.

From the foregoing brief description, it is to be appreciated that the sensor and system of the present invention provide means for rapidly and accurately detecting changes in fluid level above and below a predetermined level which is substantially independent of the temperature of the fluid.

Referring now more particularly to the embodiment of the sensor 10 illustrated in FIGS. 1 and 2 and included in the system of FIG. 3, as shown, the base 12 comprises an externally threaded tubular connector 26, a hexagon-shaped flange 28, and a cylindrical collar 30. The flange 28 extends radially from the connector 26 while the collar 30 extends axially from the back of the flange around a counterbore 31 in the connector. The connector 26 is adapted to screw tightly into a threaded hole in a wall of a vessel (not shown) at the predetermined level. In this regard, the hexagon-shaped flange 28 is adapted to receive a wrench to assist in turning the connector 26. Further, the connector 26 is shaped to tightly receive a rear end of the housing 14 with the support member 16 and the control and reference resistors 18 and 20 secured therein and extending into the vessel at about the predetermined level.

As previously stated, the housing 14 is designed to surround the support member 16 and control and reference resistors 18 and 20 with liquid when the liquid in the vessel is at or above the predetermined level. Further, the housing 14 is adapted to rapidly drain at least a portion including the control resistor when the fluid drops below the predetermined level. In this regard, the housing 14 illustrated in FIG. 1 preferably comprises a cylindrical, metal sleeve of noncorrosive material. One end 32 of the housing is tightly received in the bore of the connector 26 and an opposite end 34 is open and extends into the vessel to define fluid inlet and outlet means for at least a right end of the housing. In addition to the fluid inlet and outlet means defined by the open end 34, the housing 14 includes a top port 36 which also functions as a fluid inlet means for the housing.

As illustrated in FIG. 1, the support member 16 extends axially along the housing 14 with the control and reference resistors 18 and 20 adjacent the right and left ends thereof. In this regard, the support member 16 comprises an elongated card or other suitable support body of nonconductive material extending from a plug 38 secured in a left end of the housing. In addition to the plug 38, the support member 16 is secured in the housing 14 by a partition 40. The partition 40 tightly receives the support member 16 and divides the housing 14 into isolated compartments 42 and 44. The compartment 42 includes the reference resistor 20 and top port 36 while the compartment 44 includes the control resistor 18 and open end 34.

The control and reference resistors 18 and 20 comprise fine wire, preferably of nickel, wound tightly on the support member 16. The resistors are connected to conductive strips carried by support member 16 and are electrically connected to terminals on the connector 24 for connection in the bridge circuit of FIG. 3. In this regard, the connector 24 is generally cylindrical and fits tightly into he collar 30 and counterbore 31 with terminals 46, 48, and 50 facing the plug 38. Wires connected to the resistors 18 and 20 extend through the plug 38 and are secured to the terminals 46, 48, and 50 which, in turn, are electrically connected to corresponding output terminals 46a, 48a, and 50a for connection in the bridge circuit of FIG. 3.

In the system illustrated in FIG. 3, the control and reference resistors 18 and 20 comprise like, low resistance self-heating resistors connected in series to form two legs of the bridge circuit. The bridge is normally balanced by like balancing resistors 52 and 54 connected in series across the terminals 46a and 50a and to a voltage source. The output of the bridge circuit comprises the terminal 48a and a junction 56 of the resistors 52 and 54. The output terminals are connected to the input of an amplifier 58 having its output connected to a suitable indicator 60 such as an alarm, light, or the like.

In use and to detect changes in the level of a liquid in a vessel above and below a predetermined level, the sensor 10 is secured to the wall of the vessel at the predetermined level by screwing the connector 26 into a threaded hole in the wall of the vessel. The housing 14 an the support member 16 carrying the control and reference resistors 18 and 20 extend into the vessel at about the predetermined level. The terminals 46a, 48a, and 50a are then connected to the external balancing resistors 52 and 54, the voltage source, and amplifier 58 to complete the bridge circuit.

If the liquid in the vessel is at or above the predetermined level, liquid flows into the compartment 42 through the top port 36 to completely cover the reference resistor 20. Likewise, liquid enters the inlet and outlet means defined by the open end 34 of the sleeve to cover the control resistor 18. In this regard, it bears noting that the layer 22 of heat transmissive electrically and chemically inert material, such as Teflon or other suitable plastic material, completely seals the exterior of the support member 16, control and reference resistors 18 and 20, and conductive strips on the support member. The layer 22 therefore prevents fluid from contacting and being trapped around the windings of the resistor elements to interfere with accurate operation of the sensor. Yet, the layer 22 permits efficient heat transfer from the resistors to the surrounding liquid or gas.

When the control and reference resistors 18 and 20 are covered with liquid, they are at a like temperature, possess the same resistance value, and the bridge circuit is balanced. However, should the liquid in the vessel drop below the predetermined level, liquid rapidly drains from the compartment 44 through the open ends 34 to expose the control resistor 18 to gas within the vessel. Liquid, however, is prevented from escaping from the compartment 42. Hence, the reference resistor 20 remains covered with the liquid. While the gas or air in the vessel is at the same approximate temperature as the liquid in the vessel, its ability to absorb heat from the control resistor is much less than the liquid. The temperature of the control resistor 18 therefore rises and its resistance changes. This results in a change in the voltage across the control resistor 18 and a voltage difference between the output terminals 48a and 56. The voltage difference is amplified by the amplifier 58 and applied to the indicator 60 to produce an alarm condition indicative of the fact that the liquid in the vessel has dropped below the predetermined level.

From the foregoing description of the operation of the sensor 10 and the bridge circuit of FIG. 3, it is evident that the rate of response of the sensor is to a degree dependent upon the rate at which the compartment 44 is able to drain of liquid upon a drop in liquid level in the vessel below the predetermined level. To assist in rapid draining of the compartment 44 and shedding of liquid from and drying of the exterior of the layer 22 surrounding the control resistor 18, the housing 14 preferably includes meniscus breaking means 62 adjacent the fluid inlet and outlet means 34. Generally speaking, the meniscus breaking means 62 functions to prevent the formation of films of liquid within the compartment 44 and the trapping of bubbles therein both during the draining and filling of the compartment. To accomplish this, the meniscus breaking means 62 functions to stretch and burst liquid films as they form adjacent the inlet and outlet means 34 and the support member 16 within the compartment 44. To this end, the meniscus breaking means 62 comprises identical upper and lower meniscus breakers each including a slot 64 and a hole 66. The slots 64 lie along the gravity flow line for liquid in the housing and to this end extend axially from the open end 34 at the top and bottom of the housing 14. The holes 66 communicate directly with and intersect the slots 64 and are preferably spaced slightly from the open end 34. Additional slots and holes or plurality of holes may be included in meniscus breakers. However, the basic meniscus breaker structure for inclusion in the present invention includes at least one slot and one hole as described.

In operation, as the liquid level within the vessel begins to drop and reaches the top of the housing 14, a liquid film starts to form on the top of the housing. The film stretches across the top slot 64. While the tension of the film may be sufficient to hold over the top slot, it is insufficient to hold over the top hole 66 which causes the film to burst. The breakage of the film progresses toward the open end 34 of the housing. Liquid then is free to flow down the inner and around the outer walls of the sleeve comprising the housing 14. As the level of the liquid continues to drop, the liquid within the sleeve tends to adhere to the side walls of the layer 22 and to the bottom of the sleeve. However, as the fluid level drops, the film formed over the bottom slot 64 is stretched and burst by the bottom hole 66. The breakage of the film progresses toward the open end 34 resulting in a shedding of liquid from the entire housing 14. In this manner, the top and bottom meniscus breakers provide a rapid wicking of the wet film out of the open end 34 of the chamber 44 when the level of liquid in the vessel drops below the predetermined level.

Other functions performed by the meniscus breakers relate to the venting of the compartment 44. In this regard, upon filling the compartment 44 with liquid, bubbles tend to be trapped therein. Such bubbles of course would impair the sensitivity of the sensor. The vents formed by the slots 64 and holes 66 function to prevent bubble entrapment with variations in liquid level as well as during filling.

In addition, as the liquid in the vessel begins to splash about, the sleeve forming the housing 14 and the meniscus breaking means 62 function to prevent droplets from falling onto and producing a cooling action of the control resistor 18. In this regard, as the liquid splashes onto the sleeve, it is broken up by the slots 64 and holes 66 and flows down the walls of the sleeves rather than falling directly onto the control resistor.

Referring now more specifically to the embodiment of the sensor 10' illustrated in FIG. 4 and the system shown in FIG. 5, it is noted that but for the partition 40 and top port 36, the sensor 10' resembles closely the structure of the sensor 10. Because of the close structural similarity, like reference numerals are used in FIG. 4 to represent parts corresponding to those shown and previously described in connection with the sensor 10 and reference should be made to the prior description of such parts for a detailed understanding thereof and their interaction in the sensor 10'.

In the sensor 10', the control resistor 18 is a low resistance self-heating resistor as before. However, the reference resistor 20 is a high resistance element not of a self-heating type, and is responsive to the temperature of the surrounding environment whether it be gas or liquid. Further, in the sensor 10', the control resistor 18 and reference resistor 20 are housed in the same compartment within the housing 14'. Thus, when liquid within the vessel is at or above the predetermined level, the housing 14' fills through the open end 34 to fully cover the control resistor 18 and the reference resistor 20. Upon a drop in the level of the liquid below the predetermined level, the housing 14' rapidly drains through the open end 34 to expose both the reference resistor 20 and the control resistor 18 to gas in the vessel.

As illustrated in FIG. 5, the reference resistor 18 and the control resistor 20 are connected in opposite legs of the bridge circuit with the terminal 46a being connected to a balancing resistor 68, the terminal 48a being connected to the negative side of the voltage source, and the terminal 50a being connected to a balancing resistor 70. The resistors 68 and 70 are connected to the positive side of the voltage source. The output terminals of the bridge become the terminals 46a and the terminal 50a which are connected to the input of the amplifier 58 having its output connected to the indicator 60.

The balancing resistor 68 possesses a large resistance value matching the resistance of the reference resistor 20 while the balancing resistor 70 possesses a relatively small resistance value matching the resistance of the control resistor 18. For example, the control resistor 18 and balancing resistor 70 may have resistance values of about 200 ohms at room temperature while the reference resistor 20 and balancing resistor 68 may have resistance values of about 10,000 ohms at room temperature.

When the control resistor 18 and reference resistor 20 are covered by liquid at a common temperature, the bridge circuit shown in FIG. 5 is balanced. Upon a drop in the level of liquid in the vessel below the predetermined level, the housing 14' rapidly drains as previously indicated. Upon exposure to gases in the vessel, the control resistor 18 rapidly heats changing the value of its resistance. However, since the current flowing through the balancing resistor 68 and the reference resistor 20 is relatively small, and since the reference resistor 20 is not of a self-heating type, the temperature of the reference resistor changes little and its resistance value remains substantially constant. Due to the change in the resistance value of the control resistor 18, the bridge circuit is unbalanced and a voltage is developed at the input of the amplifier 58. The voltage is amplified by the amplifier 58 and applied to the indicator 60 to initiate an appropriate indication that the level of liquid within the vessel has dropped below the predetermined level.

Like the housing 14, the housing 14' includes the meniscus breaking means 62. This means that the draining of the housing 14' and the response of the sensor 10' are very rapid with drops in liquid level below the predetermined level.

Moreover, since the control and reference resistors 18 and 20 in the sensors 10 and 10' are normally exposed to the same temperature environment having like heat transfer characteristics, the bridge circuits comprising the sensor systems of the present invention remain balanced despite changes in the temperature of the liquid within the vessel. The systems are therefore extremely accurate and responsive over wide temperature ranges and are essentially independent of the temperature of the medium to which the sensors are exposed. This renders the sensors and systems of the present invention ideally suited for use in monitoring the levels of liquids in heavy equipment as heretofore described.

In the foregoing detailed description, the sensor of the present invention has been described as detecting changes in the level of a liquid in a container with a gas. Such description has been by way of example only, since the sensor is designed to detect changes in the level of any substance that will flow or conform to the outline of its container. Such substances are generally referred herein and in the claims as "fluids" and in addition to liquids and gases include powders, greases, and so on.

Moreover, while particular sensors and systems have been described in detail herein, it is appreciated that changes and modifications may be made therein without departing from the spirit of the invention. Accordingly, it is intended that the present invention be limited in scope only by the terms of the following claims.

We claim:

1. A sensor for sensing the level of a fluid in a vessel above and below a predetermined level, comprising:
   a base for mounting on a wall of said vessel about said predetermined level;
   a support member of nonconductive material for extending from said base into said vessel;
   a control resistor on said support member;
   a reference resistor on said support member spaced from said control resistor;
   a layer of heat transmissive, electrically and chemically inert material over and sealing said control resistor and said reference resistor on said support member;
   hollow housing means including fluid inlet and outlet means and extending from said base for surrounding said support member and control and reference resistors with fluid when fluid in said vessel is at or above said predetermined level, and for draining at least a portion of said housing including said control resistor when fluid drops below said predetermined level; and
   means for electrically connecting said control and reference resistors in a normally balanced bridge circuit connected to a voltage source and an indicator means such that a drop in fluid below said predetermined level results in an immediate unbalance of said bridge circuit and indication at said indicator means as said control resistor heats relative to said reference resistor.

2. The sensor of claim 1 including meniscus breaking means adjacent said fluid outlet means for breaking any meniscus formed during draining of said housing means.

3. The sensor of claim 2 wherein said meniscus breaking means comprises a slot in said housing means leading from said fluid outlet means and a hole in said housing means communicating with said slot.

4. The sensor of claim 1 wherein:
   said control and reference resistors are like, low resistance, self-heating resistors electrically connected in series across said voltage source in said bridge circuit; and
   said sensor further includes a partition dividing said housing means into a first compartment including said reference resistor and a second compartment including said control resistor and said fluid inlet and outlet means, and a top opening in said housing means into said first compartment whereby when fluid in said vessel is at or above said predetermined level, said control and reference resistors are covered with fluid and said bridge circuit is balanced and when fluid in said vessel drops below said predetermined level, fluid rapidly flows from said second compartment and said control resistor heats rapidly to change its resistance value relative to said reference resistor thereby unbalancing said bridge circuit and producing said indication at said indicator means.

5. The sensor of claim 4 wherein said housing means comprises a sleeve extending from said base to axially receive said support member, said sleeve being open at an outer end remote from said base to define said fluid inlet and outlet means and including meniscus breaking means extending from said open outer end of said sleeve.

6. The sensor of claim 5 wherein said meniscus breaking means comprises upper and lower meniscus breakers each including a slot and a hole in said sleeve, each slot being open to said outer end and each hole being spaced from said outer end and communicating with its associated slot.

7. The sensor of claim 1 wherein said reference resistor is a relatively high resistance resistor and said control resistor is a relatively low resistance self-heating resistor connected in different legs of said bridge circuit whereby when fluid in said vessel is at or above said predetermined level, said control and reference resistors are covered by fluid and when fluid in said vessel drops below said predetermined level, fluid rapidly drains from said housing means and said control resistor rapidly heats to change its resistance value thereby unbalancing said bridge circuit and producing said indication at said indicator means.

8. The sensor of claim 7 wherein said housing means comprises a sleeve extending from said base to axially receive said support member, said sleeve being open at an outer end remote from said base to define said fluid inlet and outlet means and including meniscus breaking means extending from said open outer end of said sleeve.

9. The sensor of claim 8 wherein said meniscus breaking means comprises upper and lower meniscus breakers each including a slot and a hole in said sleeve, each slot being open to said outer end and each hole being spaced from said outer end and communicating with its associated slot.

10. A system for detecting the level of a fluid in a vessel above and below a predetermined level, comprising:
    a base for mounting on a wall of said vessel about said predetermined level;
    a support member of nonconductive material for extending outwardly from said base into said vessel;
    a control resistor on said support member;
    a reference resistor on said support member and spaced from said control resistor;
    a layer of heat transmissive, electrically and chemically inert material over and sealing said control resistor and said reference resistor on said support members;

hollow housing means including fluid inlet and outlet means and extending from said base for surrounding said support member and control and reference resistors with fluid when fluid in said vessel is at or above said predetermined level, and for draining at least a portion of said housing including said control resistor when fluid drops below said predetermined level;

first and second balancing resistors external to said vessel;

indicator means; and circuit means connecting said reference and control resistors to said first and second balancing resistors as a normally balanced bridge circuit having an input connected to a voltage source and an output connected to said indicator means whereby a drop in the level of fluid in said vessel below said predetermined level results in an immediate unbalance of said bridge circuit and indication at said indicator means as said control resistor heats relative to said reference resistor.

* * * * *

UNITED STATES PATENT OFFICE
CERTIFICATE OF CORRECTION

Patent No. 3,701,138             Dated October 24, 1972

Inventor(s) Joseph H. Pulliam and Thomas W. Mc Curnin

It is certified that error appears in the above-identified patent and that said Letters Patent are hereby corrected as shown below:

Assignee: "Data Engineering, Inc." should read
--Iota Engineering, Inc.--

Column 1, line 67, delete "in" after "system"

Column 3, line 43, "he" should be --the--

Column 3, line 68, "an" should be --and--

Signed and sealed this 24th day of April 1973.

(SEAL)
Attest:

EDWARD M. FLETCHER, JR.            ROBERT GOTTSCHALK
Attesting Officer                  Commissioner of Patents